United States Patent [19]

Kouge

[11] Patent Number: 4,658,200
[45] Date of Patent: Apr. 14, 1987

[54] PROTECTION CIRCUIT FOR VOLTAGE REGULATOR OF VEHICLE MOUNTED GENERATOR

[75] Inventor: Shinichi Kouge, Hyogo, Japan

[73] Assignee: Mitsubishi Denki Kabushiki Kaisha, Tokyo, Japan

[21] Appl. No.: 593,348

[22] Filed: Mar. 26, 1984

[30] Foreign Application Priority Data

Mar. 25, 1983 [JP] Japan .................................. 58-50894
Mar. 25, 1983 [JP] Japan .................................. 58-50895
Apr. 5, 1983 [JP] Japan .................................. 58-60595

[51] Int. Cl.$^4$ ............................................. H02J 7/14
[52] U.S. Cl. ........................................ 322/25; 320/64; 322/27; 322/28; 322/59; 322/99; 361/20
[58] Field of Search .................. 322/25, 28, 27, 59, 322/6, 99; 361/20, 21; 320/64, 68

[56] References Cited

U.S. PATENT DOCUMENTS

| | | | |
|---|---|---|---|
| 3,263,155 | 7/1966 | Dietl | 322/59 X |
| 3,705,331 | 12/1972 | South et al. | 322/25 X |
| 4,106,069 | 8/1978 | Trautner et al. | 322/25 X |
| 4,200,832 | 8/1980 | Johansson et al. | 322/59 |

*Primary Examiner*—R. J. Hickey
*Attorney, Agent, or Firm*—Sughrue, Mion, Zinn, Macpeak & Seas

[57] ABSTRACT

A protection circuit for a charging generator against a short-circuit of a field winding of an a.c. generator included therein is disclosed, in which an output transistor of a voltage regulator of the charging generator is on-off controlled when a collector current of said output transistor exceeds a predetermined high value.

3 Claims, 19 Drawing Figures

CONTROL
TRANSISTOR
OUTPUT

FIG. 17

COMPARATOR
TERMINAL

FIG. 18

TRANSISTOR
OUTPUT

FIG. 19

COMPARATOR
OUTPUT

PROTECTION CIRCUIT FOR VOLTAGE REGULATOR OF VEHICLE MOUNTED GENERATOR

BACKGROUND OF THE INVENTION

This invention relates to a control device of a vehicle mounted, charging generator driven by, for example, an internal combustion engine thereof for regulating an output voltage of the motor generator to a predetermined value and, particularly, to a protection circuit for use in a such control device for protecting an output transistor of the control device when excess current flows due to, for example, a short-circuit of a field winding of the generator.

Figure 1:
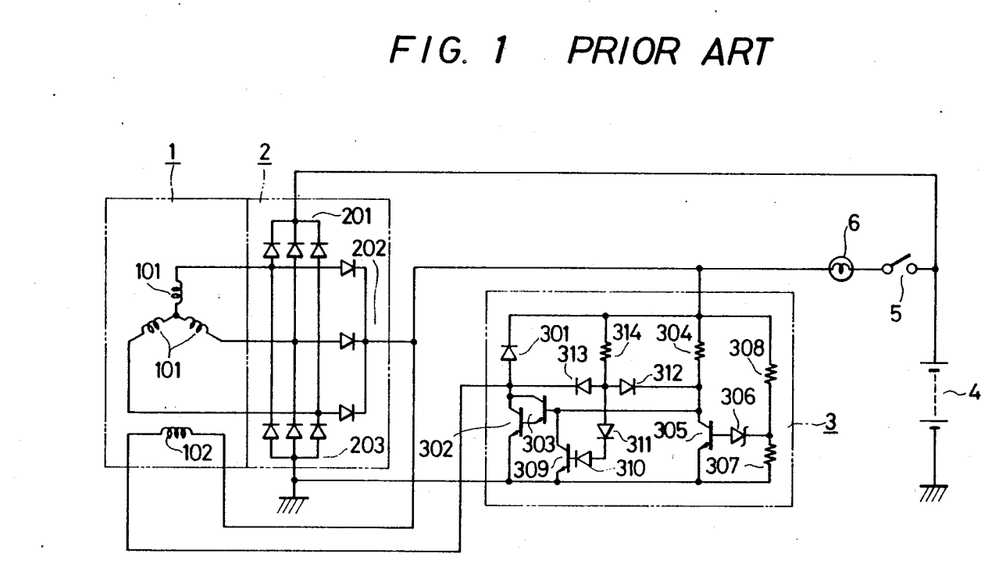
FIG. 1 is a circuit diagram showing an example of a conventional changing a.c. generator having a voltage regulator.

FIG. 1 shows an example of a conventional voltage regulator of a vehicle-mounted generator in which a three-phase a.c. generator 1 includes a three-phase star wired armature winding 101 and a field winding 102. A full wave rectifier 2 for rectifying an a.c. output of the generator 1 includes a first d.c. output terminal 201, a second d.c. output termnal 202 and a grounding terminal 203. A voltage regulator 3 controls an output voltage of the generator 1 to be a first predetermined value by controlling a field current flowing through the field winding 102 and includes a surge absorbing diode 301 connected across the field winding 102, output transistors 302 and 303 for on-off controlling the field current, a resistor 304 constituting base circuits of the transistors 302 and 303, a transistor 305 for on-off controlling the output transistors 302 and 303, a Zener diode 306, responsive to the output voltage of the generator 1, which turns on when the output voltage becomes equal to or higher than the first predetermined voltage, resistors 307 and 308 connected in series with each other and constituting a voltage divider circuit for the output voltage of the generator 1, a limiting transistor 309 connected in parallel to the control transistor 305 for on-off controlling the transistors 302 and 303, level shift diodes 310 and 311 connected in series with a base terminal of the transistor 309, a first detection diode 312 for detecting a collector voltage of the control transistor 305, a second detection doide 313 for detecting a collector voltage of the output transistors 302 and 303, a base resistor 314 disposed in the base circuit of the limiting transistor 309, a battery 4, a key switch 5 and a charge indicator lamp 6.

In operation, when there is no short-circuit between phases of the field winding 102 and the key switch 5 is closed to start the engine, a base current flows from the battery 4 through the key swtich 5, the charge indicator lamp 6 and the base resistor 304 of the output transistor 303 to turn the latter transistor on and thus the output transistor 302 is turned on. Upon the conduction of the transistor 302, a field current flows from the battery 4 through the key switch 5, the charge indicator lamp 6, the field winding 102 and the transistor 302 and thus a field magnetomotive force is generated. At this time, a collector-emitter voltage of the output transistor 302 is lower than a sum base-emitter voltage of the limiting transistor 309 and a forward voltage drop of level shift diodes 310 and 311 and thus the transistor 309 is turned off.

Then when the engine is started to drive generator 1 and an output voltage of the generator 1 exceeds the first predetermined value of the voltage regulator 3, the Zener diode 306 and the control transistor 305 are turned-on and the output transistors 302 and 303 are turned-off. Therefore, the output voltage of the generator 1 is lowered. Since, at this time, the control transistor 305 is conductive, a collector-emitter voltage of the latter becomes lower than a sum of the base-emitter voltage of the control transistor 309 and the forward voltage drop of the diodes 310 and 311 and thus the limiting transistor 309 is kept non-conductive.

When the output voltage of the generator is lowered to the first predetermined level, the output transistors 302 and 303 are turned on again to energize the field winding 102 to thereby increase the output voltage of the generator. The output voltage of the generator 1 can be regulated at the first predetermined level upon repetitions of the above mentioned operations.

On the other hand, if the field winding 102 is short-circuited or there is an inter-phase short-circuit, when the key switch 5 is closed while the engine is in the rest state, the collector current of the output transistor 302 is sharply increased. However, since the base current of the transistor 303 is limited by the resistor 304, amplification is not sufficient and the voltage between the collector and the emitter of the transistor 302 becomes equal to or above a sum of the base-emitter voltage of the limiting transistor 309 and the forward voltage drop of the diodes 310 and 311. Since the engine is in the rest state at this time and there is no output generated by the generator 1, the Zener diode 306 and the control transistor 305 are non-conductive. Therefore, a current flows through the resistor 314, the diodes 310 and 311 and the base-emitter of the limiting transistor 309 to turn the latter on. Thus, the output transistors 302 and 303 are cut off, so that a breakdown of the output transistor 302 and 303 due to very large collector currents can be prevented.

Figure 2:
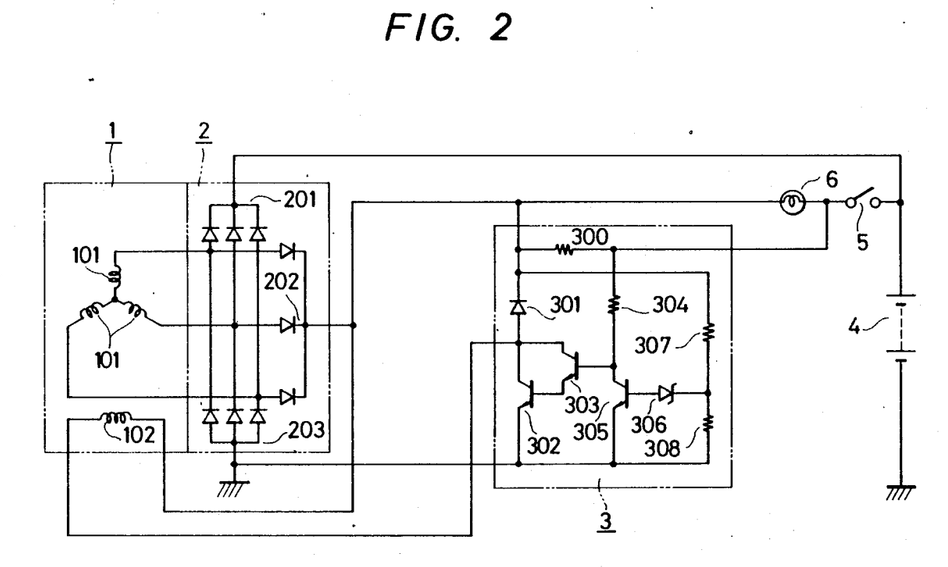
FIG. 2 is a circuit diagram showing another example of the conventional generator.

In the conventional device shown in FIG. 1 or 2, the collector current of the output transistor 302 and hence the collector current of the output transistor 303 necessary to turn-on the limiting transistor 309 is usually set at a very large value compared with a collector current in a normal conductor state. Therefore, there is no large increase of current in a case of inter-phase short-circuit of the field winding 102. Further, in a conventional system where the field current is supplied from an output terminal of a second rectifier, the output voltage of the generator 1 is lowered in a case of rare short-circuit. Therefore, there is no large increase of the collector currents of the transistors 302 and 303 and the collector potentials of the transistors 302 and 303 do not increase to values at which the limiting transistors 309 is turned-on. Therefore, the transistor 302 may break down.

FIG. 2 shows another example of the conventional device in which a resistor 300 is connected in parallel to the charge indicator lamp 6 so that even if the lamp 6 is broken it impossible to supply the initial energizing current to the generator 1 and the limiting transistor 309, the level shift diodes 310 and 311, the detector diodes 312 and 313 and the resistor 314 in FIG. 1 are omitted.

The problem inherent in the conventional device in FIG. 1 also exists in the example shown in FIG. 2. That is, in FIG. 2, when there is an inter-phase short-circuit when the field winding 102 is in operation or when the failed voltage regulator 3 is replaced by a new voltage regulator while such inter-phase short-circuit has not been indicated, a very large current which is larger than a predetermined field current may flow through the output transistor 302 causing the latter to break down.

SUMMARY OF THE INVENTION

An object of the present invention is to provide a protection circuit for use in connection to a voltage regulator of a charging generator driven by an internal combustion engine for protecting the voltage regulator when a field winding of the generator is short-circuited or there is an inter-phase short-circuit.

DESCRIPTION OF THE PREFERRED EMBODIMENTS

Figure 3:
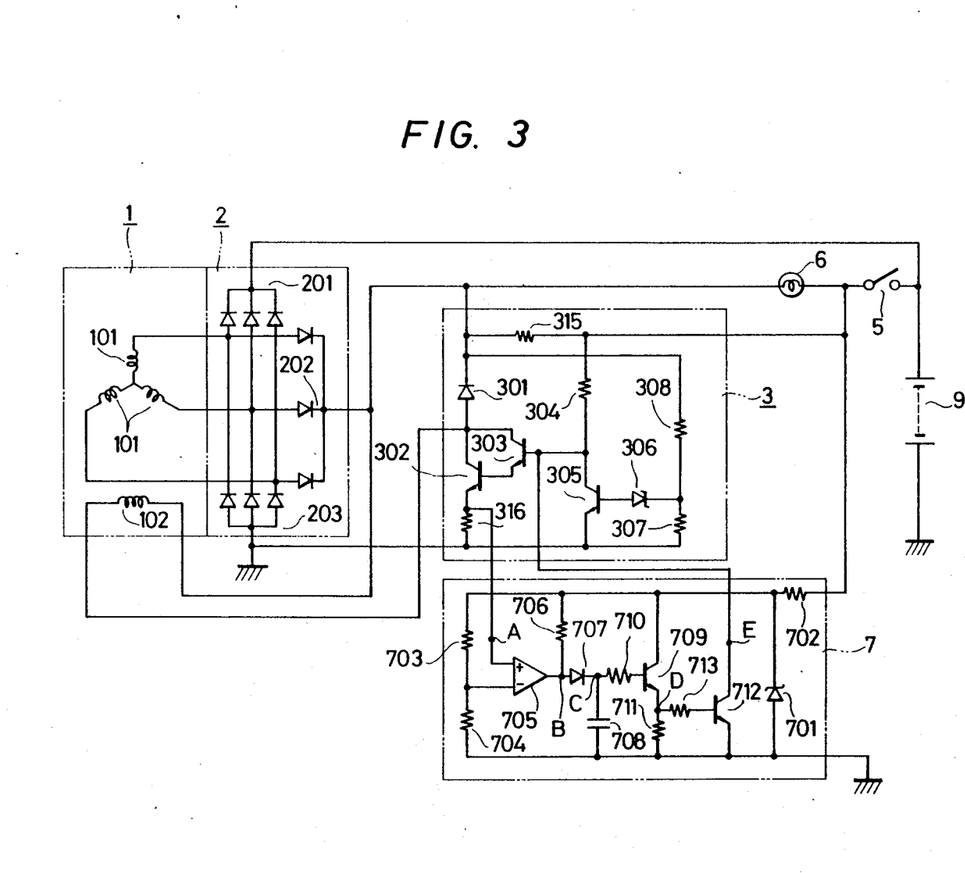
FIG. 3 is a circuit diagram showing an embodiment of the present invention.
Figure 4:
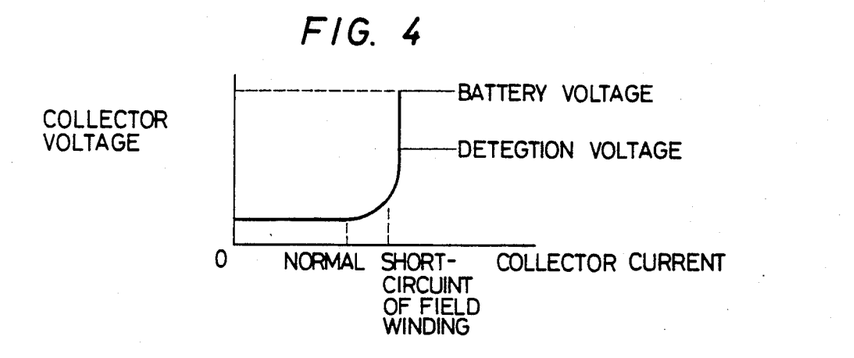
FIG. 4 is a waveform showing a collector current-collector potential characteristics of an output transistor of the voltage regulator.

In FIG. 3 which shows a protection circuit according to an embodiment of the present invention when applied to the device in FIG. 2, the protection circuit 7 compresses a Zener diode 701 which constitutes a power source of the protection circuit 7. The latter further includes a resistor 702 for supplying a bias current to the Zener diode 701, series connected current limiting resistors 703 and 704 for limiting the current to the second predetermined value, a comparator 705 for providing no output when a collector current of the output transistor 302 exceeds the second predetermined current, a resistor 706 connected to an output of the first comparator 705, a diode 707 for charging a capacitor 708 through the resistor 706 and holding a charged state thereof when the first comparator 705 has no output, the capacitor 708 being charged when the collector current of the transistor 302 is equal to or exceeds the second predetermined value, a resistor 710 connected to a base of the transistor 709, a resistor 711 for determining the collector current of the transistor 709, a second transistor 712 which is made conductive when the first transistor 709 is turned-on and a resistor 713 connected to a base of the second transistor 712.

Figure 5:
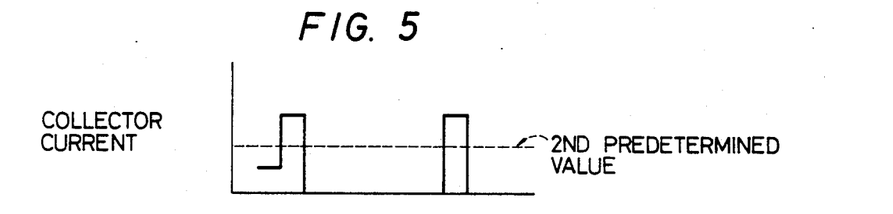
FIG. 5 is a waveform showing a detection current of a shunt resistor of the embodiment in FIG. 4.
Figure 6:
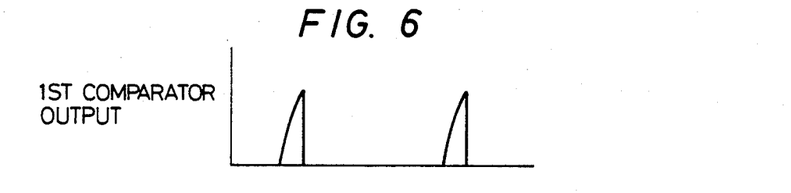
FIG. 6 is an output waveform of a first comparator in FIG. 4.
Figure 7:
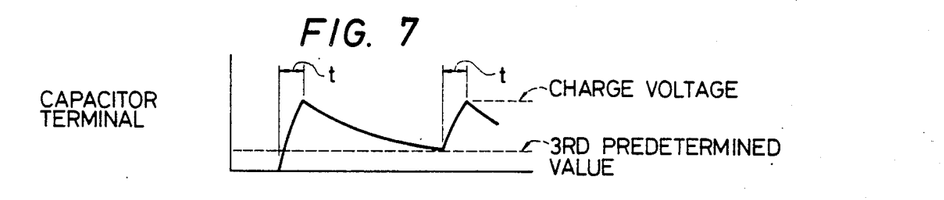
FIG. 7 is a voltage waveform at a capacitor in FIG. 4.

In operation, an inter-phase short-circuit etc. of the field winding 102 occurs when the control transistor 305 is in the non-conductive state and the output transistors 302 and 303 are in the conductive state, and an excess current flows through the output transistor 302 as shown in FIG. 5. When a voltage drop across the current detecting shunt resistor 316 exceeds the second predetermined value determined by the resistors 703 and 704, the output of the comparator 705 terminates as shown in FIG. 6. As a result, the capacitor 708 is immediately charged through the resistor 706 and the diode 707 as shown in FIG. 7.

When the voltage of the capacitor 708 increases above a base-emitter voltage of the first transistor 709, the latter is turned on due to a base current supplied through the resistor 710. At this time, the collector current of the first transistor 709 is determined by the resistor 711 and a discharge current of the capacitor flowing through the resistor 710 becomes a value obtained by dividing the collector current of the first transistor 709 by a current amplification factor of the latter transistor. The voltage waveform at a junction of the resistors 711 and 713 becomes similar to that shown in FIG. 7.

Figure 8:
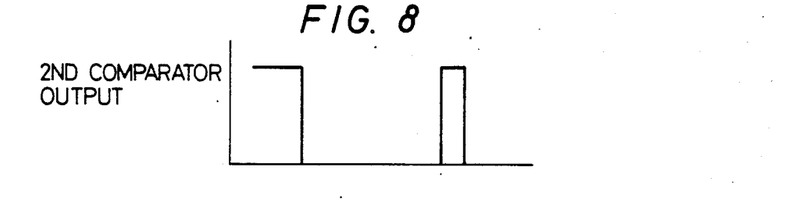
FIG. 8 is an output waveform of an output transistor of the protection circuit in FIG. 4.
Figure 9:
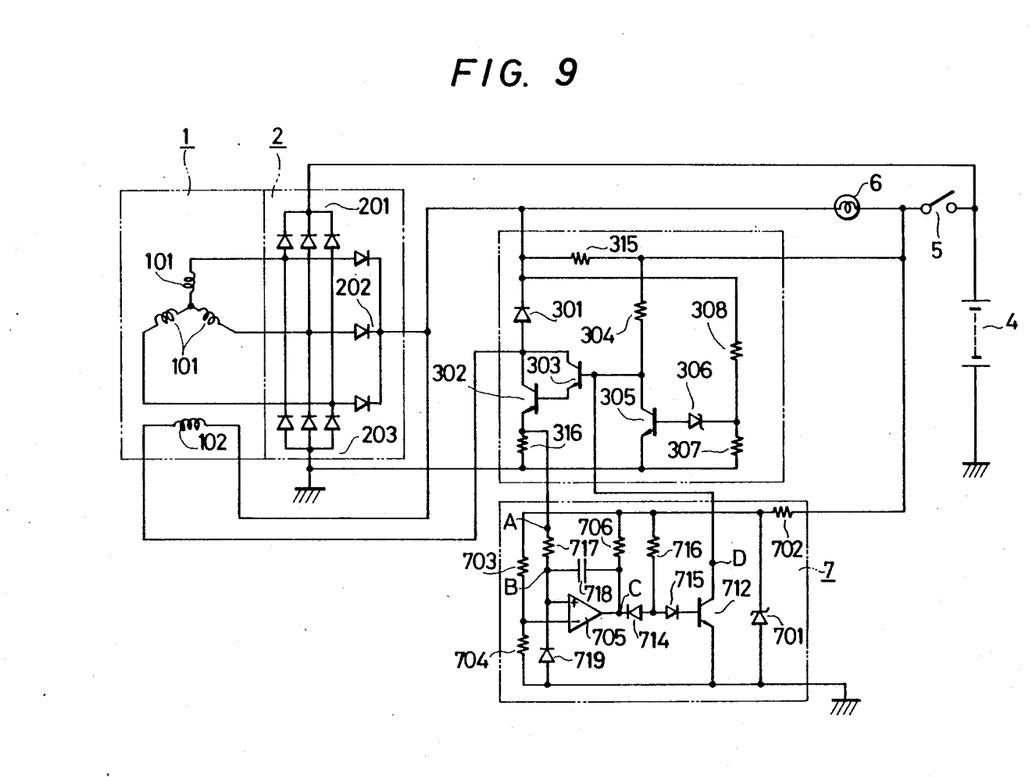
FIG. 9 is a circuit diagram of another embodiment of the present invention.

When the first transistor 709 is turned-on and the voltage of the capacitor 708 becomes equal to or higher than a third value which is a sum of the base-emitter voltage of the transistor 709 and the base-emitter voltage of the second transistor 712, the second transistor 712 is turned-on a time after the shunt resistor 316 detects an over current above the second value and thus the output transistors 302 and 303 are turned-off. Upon the turning off of the output transistors, the comparator 705 provides an output again as shown in FIG. 6. However, since the diode 707 blocks a discharge of the capacitor 708 towards the comparator output, the discharge is performed through the resistor 710 gradually as shown in FIG. 7. The first and second transistors are kept conductive until the charge voltage of the capacitor 708 is lowered below the third value. When the charge voltage is lowered below the third value, the second transistor 712 is turned off as shown in FIG. 8 and the output transistors 302 and 303 are turned-on again. When an over current above the second value flows again through the output transistor 302 as shown in FIG. 5, the above operation is repeated. FIG. 9 shows another embodiment of the present invention, in which the same or similar circuit components to those in FIG. 3 are depicted by the same reference numerals. In the embodiment in FIG. 9, the protection circuit 7 includes a Zener diode 701, a resistor 702 for supplying a bias current to the Zener diode 701, series connected current limiting resistors 703 and 704 and a transistor 712 adapted to be turned on when the comparator 705 has no output, which are the same as those of the embodiment in FIG. 3. The protection circuit 7 further includes a capacitor 718 inserted between an input and an output of the comparator 705 to be run as a feedback circuit functioning as a cut-off holding circuit for cutting-off the comparator for a time, a resistor 717 for determining a charge- and discharge time constant of the capacitor 718, a resistor 706 connected to the output of the comparator 705, a diode 719 for preventing the comparator 705 from being broken by a negative potential at a non-inverting input (+) thereof due to the charge of the capacitor 718 when the comparator is switched from a non-conductive state to a conductive state, a diode 714 for transmitting the ouput sign of the comparator 705 to a subsequent state, a level shift diode 715 connected to the base of the transistor 712 and a resistor 716 for supplying a base current to the transistor 712.

Figure 10:
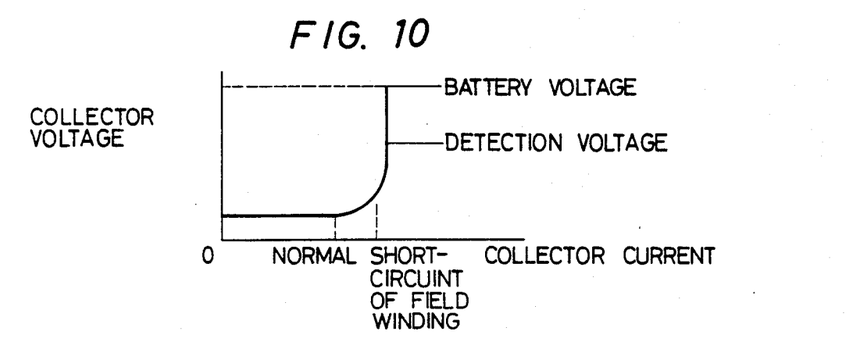
FIG. 10 is a voltage waveform showing a collector current-potential characteristics of an output transistor in FIG. 9.
Figure 11:
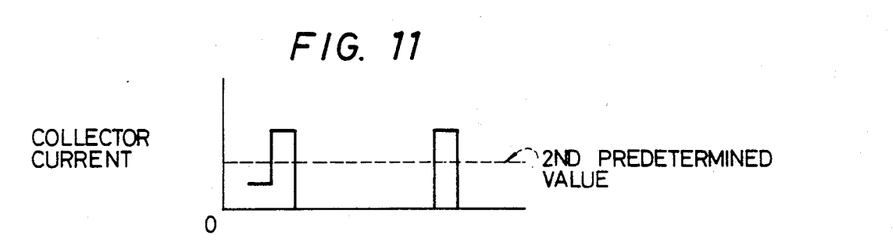
FIG. 11 is a waveform showing a detection current of a shunt resistor of the embodiment in FIG. 9.
Figure 12:
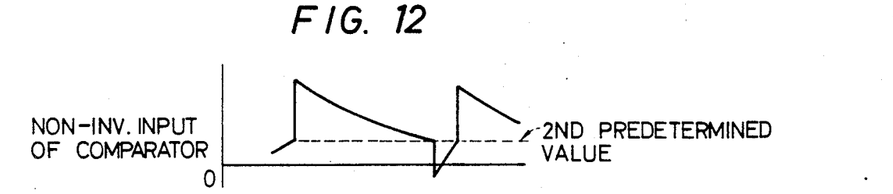
FIG. 12 is a waveform showing an input ot a non-inverting input of a comparator of the embodiment in FIG. 9.
Figure 13:
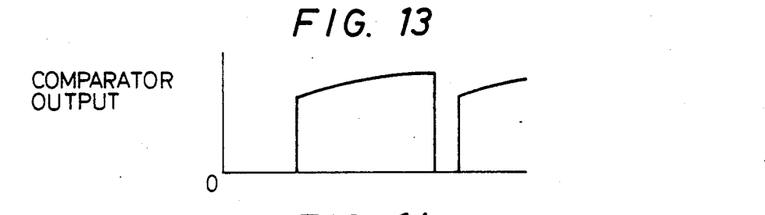
FIG. 13 is an output waveform of the comparator in FIG. 9.
Figure 14:
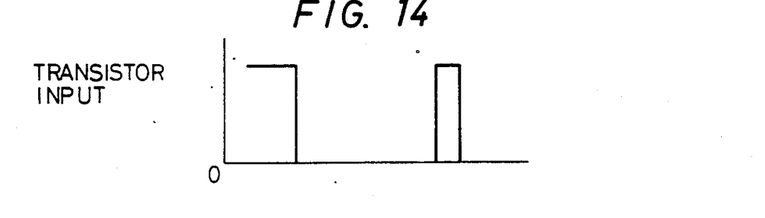
FIG. 14 is an output waveform of an output transistor of the protection circuit in FIG. 9.

In operation, when an over current flows through the output transistor 302 due to conditions such as an inter-phase short-circuit as shown in FIG. 11, while the control transistor 305 is non-conductive and the transistor 302 is conductive as shown in FIG. 10, the capacitor 718 is charged through the resistor 717 since the compartor 705 has been providing an output, as shown in FIG. 12. When the charge voltage at the comparator input side of the capacitor 718 exceeds a second value determined by the resistor 703 and 704, the comparator 705 terminates to provide an output as shown in FIG. 13. Therefore, the transistor 712 is turned-on by a base current flowing through the resistor 716 and the diode 715. Thus, the output transistors 302 and 303 are turned-off. At this time, when the resistance of the resistor 717 is selected as large enough with respect to that of the resistor 706, the comparator 705 is kept non-conductive even when the voltage of the capacitor at the comparator input side is higher than the second value and the output transistor is in non-conductive state, as shown in FIG. 12. Then, also shown in FIG. 12, the capacitor 718 changes gradually through the resistors 717 and 706 and when the voltage becomes the second value, the comparator 705 provides the output and the transistor 712 is turned off, as shown in FIG. 14.

The charge of the capacitor 718 is immediately discharged through the diode 719 and the resistors 717 and 316.

Upon the turning-off of the transistor 712, the output transistor 302 is turned on again. This operation is repeated upon subsequent detection of over current through the transistor 302.

Figure 15:
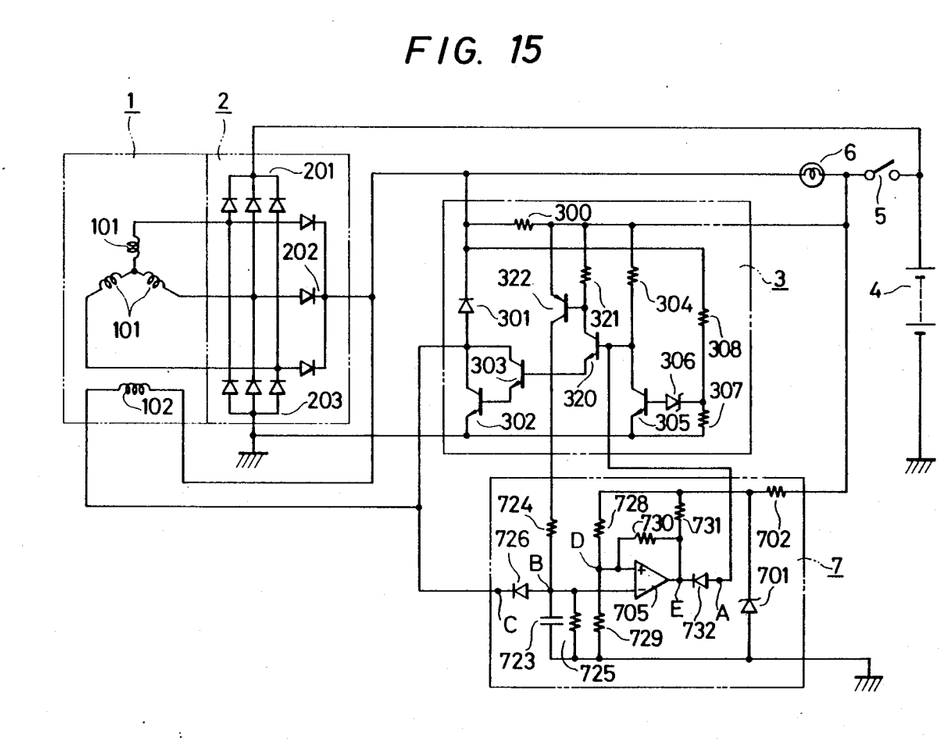
FIG. 15 is a circuit diagram of another embodiment of the invention.

FIG. 15 shows another embodiment of the protection circuit according to the prevent invention. In this embodiment, the voltage regulator in FIG. 2 is modified by adding transistors 320 and 322 and a resistor 321.

In FIG. 15, the transistor 320 is a drive transistor for the output transistor 302 and the resistor 321 is connected to a collector of the transistor 310 and the transistor 322 is a detection transistor for detecting a drive signal for the output transistors 302 and 303.

The protection circuit 7 includes a Zener diode 701, a resistor 702 for supplying a bias current to the Zener diode 701, a capacitor 723 adapted to be charged when the short-circuit of the field winding 102 or the inter-phase short-circuit thereof occurs, a resistor 724 for supplying a charging current to the capacitor 723, a discharge resistor 725 for the capacitor, a diode 726 for discharging the capacitor when the output transistor 302 is conductive, a comparator 705 which provides an output when the short-circuit of the field winding 102 or the inter-phase short-circuit thereof occurs, resistors 728, 729, 730 and 731 constituting a hysterisis circuit for setting a reference voltage of the comparator 705 with respect to a charging voltage of the capacitor 723, and a diode 732 for turning-off the drive transistor 320 when the comparator 705 provides the output.

In operation, when the key switch 5 is closed to ignite the engine, a base current flows from the battery 4 through the key switch 5 and the resistor 304 to the drive transistor 320. As a result, the latter is turned-on and the output transistors 302 and 303 are also turned-on. Therefore, a field current flows from the battery 4 through the key switch 5, the charging indicator lamp 6 and the initial existing resistor 309 to the field winding 102.

Figure 17:
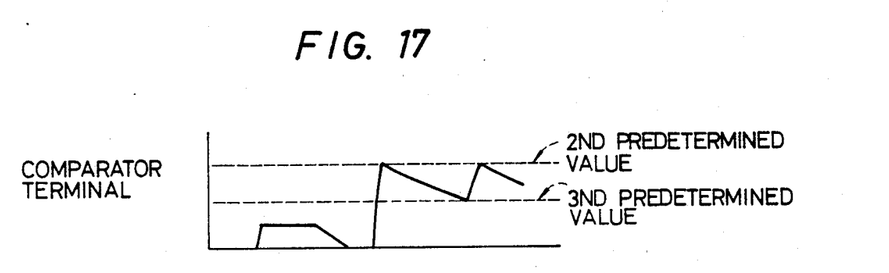
FIG. 17 is a voltage waveform at a capacitor of the protection circuit in FIG. 15.

At this time, where there is no inter-phase short-circuit etc. of the field winding 102, the detection transistor 322 is turned-on due to a voltage drop across the resistor 321 and the capacitor 723 is charged. However, since a collector-emitter voltage of the output transistor 302 is lowered due to the turningon thereof, the capacitor is discharged through the diode 726, as shown in FIG. 17.

Figure 16:
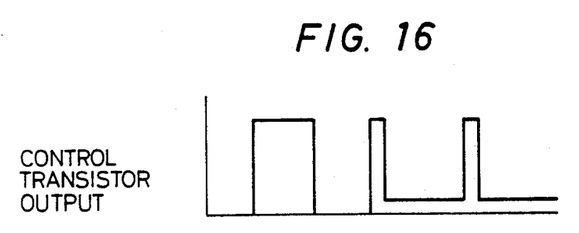
FIG. 16 is a waveform showing an output of a control transistor in FIG. 15.

Then, when the engine is ignited and the generator 1 generates an output voltage exceedng the first value, the Zener deode 306 and the control transistor 305 are turned-on as shown in FIG. 16 and the drive transistor 320 is turned-off. Therefore, the transistor 320 is turned-off causing the output voltage of the generator 1 to be lowered. At this time, the capacitor 723 is discharged through the resistor 724 because the transistor 322 is turned off, as shown in FIG. 17.

Under such conditions, where there is a short-circuit of the field winding 102 or an inter-phase short-circuit thereof occurred and the output voltage of the generator become the first value or lower, the output transistor 302 is turned-on again. However, the collector current thereof increases abruptly. Since the base current thereof is determined by the resistor 321, the collector potential of the output transistor increases. Therefore, the charge of the capacitor 723 can not be discharged through the diode 726 and thus the voltage at a junction of the capacitor 723 and the diode 726 becomes higher than the second value indicating the over current condition and the comparator 705 provides an output as shown in FIG. 17. Therefore, the drive transistor 320 is turned-off by the diode 732 and thus the output transistor 302 is also turned off.

A voltage at the non-inverting input of the comparator 705 is normally at the second value determined by a ratio of the resistance of the resistor 727 to the composite resistance of a parallel circuit of the resistor 730 and 731 since the comparator 705 does not provide an output. On the other hand, when the over current is detected, the comparator 705 provides the output, the voltage becomes a third value which is lower than the second value and is determined by the ratio.

Figure 18:
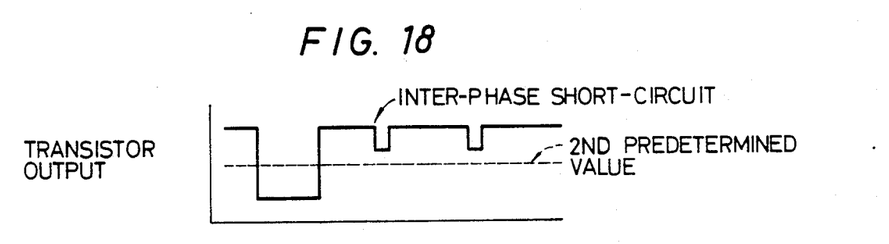
FIG. 18 is an output waveform of the output transistor in FIG. 15.
Figure 19:
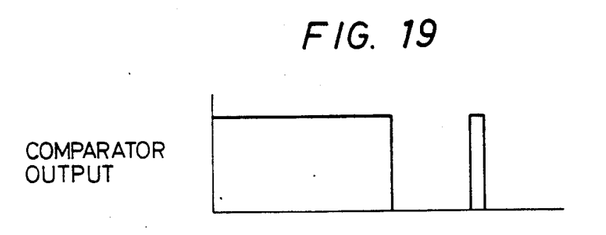
FIG. 19 is an output waveform of the comparator in FIG. 15.

Upon the turning-off of the transistor 320, the transistor 322 is also turned off and the capacitor 723 is discharged through the resistor 725 as shown in FIG. 17. At this time, since the voltage at the non-inverting input of the compartor 705 is at the third value, the comparator 705 is kept providing the output and thus the output transistor 302 is kept non-conductive as shown in FIG. 18. Then the capacitor 723 is discharged as shown in FIG. 17. When the voltage at the inverting input of the comparator 705 becomes the third value or lower, the comparator 705 terminates to provide the output as shown in FIG. 19 and thus, the transistors 320 an 302 are turned-on again. This operation is repeated upon the over current condition detected.

As mentioned hereinbefore, according to the protection circuit of the present invention, the output transistor of the voltage regulation is on-off controlled in the predetermined manner when the over current higher than the second predetermined level flows therethrough due to the short-circuit etc. of the field winding of the generator. Therefore, the average heat generation of the output transistor is minimized and a breakdown of the voltage regulation is prevented. Further, a breakdown of the device due to erroneous windings during repair of the device, etc. can be effectively prevented.

What is claimed is:

1. In a charging generator system including an A.C. generator having an armature winding and a field winding, a battery to be charged by a rectified output of said A.C. generator and a voltage regulator for regulating said rectified output of said A.C. generator to a first predetermined value, said field winding being energized by said recified output of said generator, a protection circuit for said charging generator system against a short-circuit of said field winding, said protection circuit comprising an output transistor connected in series with said field winding to on-off control a field current thereof, a resistor connected to a base of said output transistor, a drive transistor connected in series between said resistor and said base of said output transistor, a detection transistor for detecting a current flowing through said resistor, a comparator having hysterisis characteristics, a capacitor connected to an input of said comparator and adapted to be charged by a logical product of an output voltage of said detection transistor and a terminal voltage of said output transistor and a resistor constituting a discharging circuit for said capacitor, said drive transistor being turned-off when said capacitor is charging.

2. In a charging generator system including an A.C. generator having an armature winding and a field winding, a battery to be charged by a rectified output of said A.C. generator and a voltage regulator for regulating said rectified output of said A.C. generator to a first predetermined value, said field winding being energized by said rectified output of said A.C. generator, a protection circuit for said charging generator system against a short-circuit of said field winding, said protection circuit comprising an output transistor connected in series with said field winding to on-off control a field current thereof, a shunt resistor for detecting the field current, a comparator responsive to the field current detected by said shunt resistor above a second predetermined value larger than said first predetermined value to provide an output, a protection transistor adapted to be driven by the output of said comparator, and a positive feedback circuit connected between input and output terminals of said comparator, said positive feedback circuit including a capacitor connected between said output terminal and a positive input terminal of said comparator, wherein said positive feedback circuit causes an output of said comparator to decrease and turning off said output transistor for a period of time substantially corresponding to a time constant of said capacitor in said positive feedback circuit.

3. In a charging generator system including an A.C. generator having an armature winding and a field winding, a battery to be charged by a rectified output of said A.C. generator and a voltage regulator for regulating said rectified output of said A.C. generator to a first predetermined value, said field winding being energized by said rectified output of said A.C. generator, a protection circuit for said charging generator system against a short-circuit of said field winding, said protection circuit comprising an output transistor connected in series with said field winding to on-off control a field current thereof, a shunt resistor for detecting the field current, a comparator responsive to the field current detected by said shunt resistor above a second value larger than said first predetermined value to provide an output, a first transistor driven by the output of said comparator, a second transistor driven by said first transistor and a charge-discharge circuit connected between said comparator and said first transistor, said charge-discharge circuit having a small time constant for charge and a larger time constant for discharge and driving said first transistor for a period determined in accordance with a time constant of said charge-discharge circuit, after said field current has fallen below said second value.

* * * * *